United States Patent [19]
Brasier et al.

[11] Patent Number: 4,629,025
[45] Date of Patent: Dec. 16, 1986

[54] FLOW REGULATED POWER ASSIST STEERING SYSTEM WITH EVASIVE MANEUVER CAPABILITY

[75] Inventors: Brian D. Brasier; Kenneth J. Hill, both of Saginaw; John F. Yonker, Frankenmuth, all of Mich.

[73] Assignee: General Motors Corporation, Detroit, Mich.

[21] Appl. No.: 693,518

[22] Filed: Jan. 22, 1985

[51] Int. Cl.⁴ ............................................. B62D 5/04
[52] U.S. Cl. ..................................... 180/142; 180/141
[58] Field of Search ............... 180/143, 142, 141, 132, 180/79.1

[56] References Cited

U.S. PATENT DOCUMENTS 3,939,938  2/1976  Inoue .................................... 180/142
4,473,128  9/1984  Nakayama ............................ 180/142
4,530,414  7/1985  Fukino ................................. 180/142
4,540,059  9/1985  Shibahuta ............................ 180/141
4,541,499  9/1985  Yanai ................................... 180/142

FOREIGN PATENT DOCUMENTS 0209655  12/1983  Japan .................................... 180/142

Primary Examiner—John J. Love
Assistant Examiner—Mark C. Dukes
Attorney, Agent, or Firm—Mark A. Navarre

[57] ABSTRACT

A method of regulating the flow of hydraulic fluid to a hydraulic assist power steering system for providing assist capability which decreases with increasing vehicle speed but which is prevented from falling below a predetermined level in response to handwheel rotation regardless of vehicle speed.

8 Claims, 8 Drawing Figures

FLOW REGULATED POWER ASSIST STEERING SYSTEM WITH EVASIVE MANEUVER CAPABILITY

This invention relates to hydraulic systems for providing steering assist in motor vehicles and more particularly to a system in which the hydraulic flow is controlled in relation to vehicle speed so as to effect a reduction in the level of assist provided during high speed vehicle operation.

In systems of the above type, the hydraulic system is generally connected in parallel with a linkage mechanism coupling an operator manipulated handwheel to the steerable wheels of the vehicle. Typically, the hydraulic system comprises a hydraulic power cylinder coupled to the linkage mechanism, and a pump or source of pressurized hydraulic fluid. A valving mechanism directs hydraulic fluid from the pump to the power cylinder in relation to the magnitude and direction of steering torque applied to the handwheel so as to hydraulically generate a steering assist force on the linkage mechanism which aids that supplied by the operator.

It is generally known by those familiar with steering systems of the above type that improvements in efficiency and drivability may be achieved by reducing the hydraulic flow with increasing vehicle speed. At low vehicle speeds, a relatively high level of steering assist is likely to be required and the hydraulic flow is maintained at a relatively high level under such conditions to provide that capability. At high vehicle speeds, a relatively low level of steering assist is likely to be required and the hydraulic flow is reduced under such conditions to effect an energy savings and to improve the on-center stability of the vehicle.

However, handwheel movements made by the operator of the vehicle tend to increase the fluid flow requirement if the vehicle speed determined level of assist capability is to be maintained. The faster the handwheel movement, the more flow required to maintain the power cylinder pressurized at a value which provides the vehicle speed determined level of assist for a given amount of operator supplied steering torque. When an evasive maneuver is attempted, the handwheel speed of rotation is relatively high and the vehicle speed determined flow value may be insufficient to even backfill the power cylinder. In such event, the hydraulic assist is lost and the operator must provide all of the required steering force through the handwheel. Through extensive vehicle testing, we have determined that, while some reduction in the level of steering assist capability due to handwheel movement is acceptable, and perhaps desirable, it should not be permitted to fall below a predetermined relatively low level regardless of the vehicle speed.

Accordingly, the primary object of this invention is to provide an improved hydraulic assist steering system for a motor vehicle wherein the hydraulic flow is reduced with increasing vehicle speed and wherein at least a predetermined level of steering assist capability is maintained in any steering maneuver regardless of the vehicle speed.

The above object and related other objects are carried forward according to this invention with a hydraulic flow control device actuated in response to one of a plurality of flow commands. A first flow command is determined in relation to the vehicle speed, such command being relatively high to provide a high level of power assist capability at low vehicle speeds and relatively low to provide a lower level of power assist capability at high vehicle speeds to thereby effect energy savings and improved drivability at higher vehicle speeds. A second flow command is determined in relation to the handwheel speed of rotation and represents the flow needed to maintain a predetermined relatively low level of power assist capability when the flow requirement of the hydraulic power cylinder is increased due to movement of the handwheel by the operator of the vehicle.

The first and second flow commands are compared and the hydraulic flow control device is controlled in accordance with the higher of the two flow commands. As a result, the flow supplied from the fluid pressure source is decreased with increasing vehicle speed except during rapid handwheel movement at which time the flow is increased to a value sufficient to provide the predetermined level of power assist capability. At the termination of the handwheel movement, the first flow command is once again the higher command and the flow control device is actuated to decrease the flow to the value indicated by the first flow command. In the preferred embodiment, such decrease is effected at a controlled rate so that the transition is essentially transparent to the operator of the vehicle.

In order to ensure that a relatively high level of steering assist is provided when the vehicle is being steering along a circular path, such as an extended bend in the roadway or a freeway ramp, a third flow command may be generated as a function of the handwheel angle of rotation. To effect such a control, the third flow command is compared with the first and second flow commands and the hydraulic flow control device is controlled in accordance with the highest of the three flow commands.

In the Drawings

Figure 5:
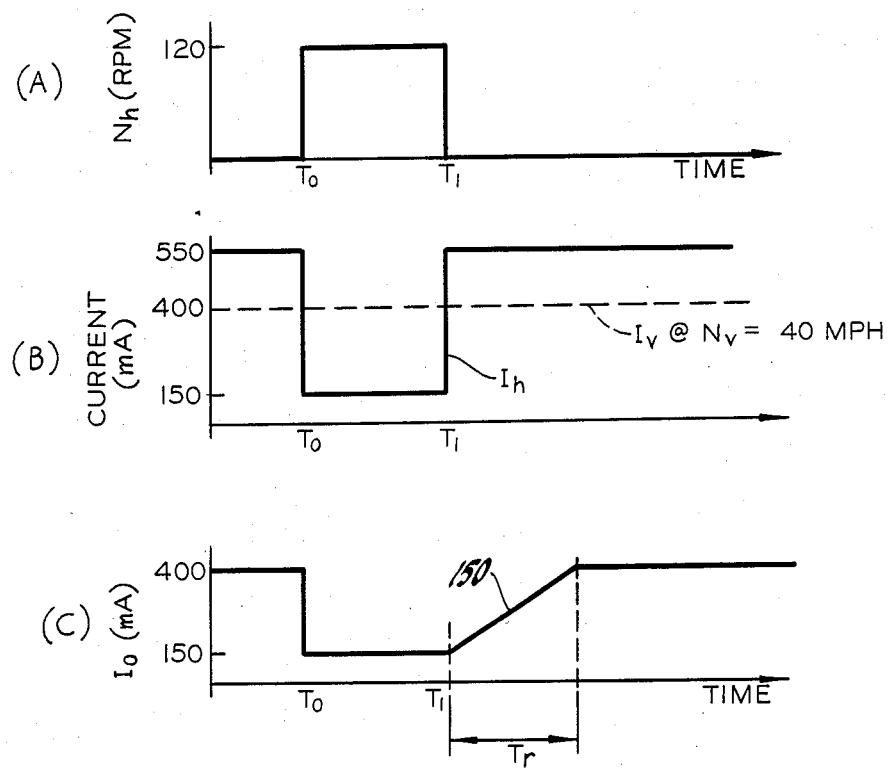

FIGS. 5A-C are graphs illustrating the operation of the flow control method of this invention at the termination of an evasive maneuver.

Figure 6:
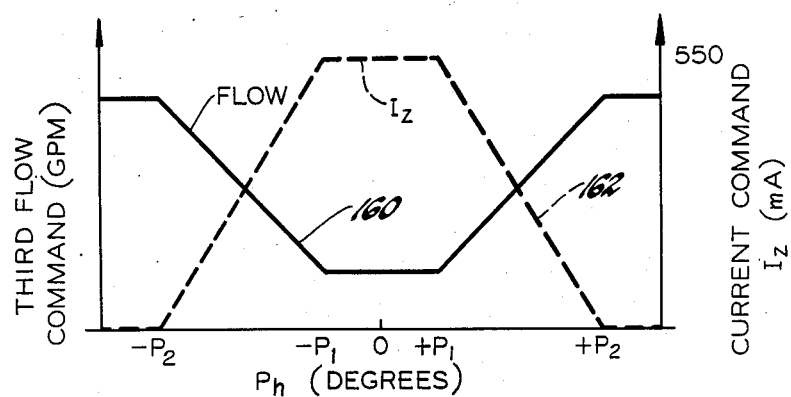

FIG. 6 is a graph depicting the third flow command and a corresponding current command $I_z$ as a function of the handwheel angle of rotation.

Figure 1:
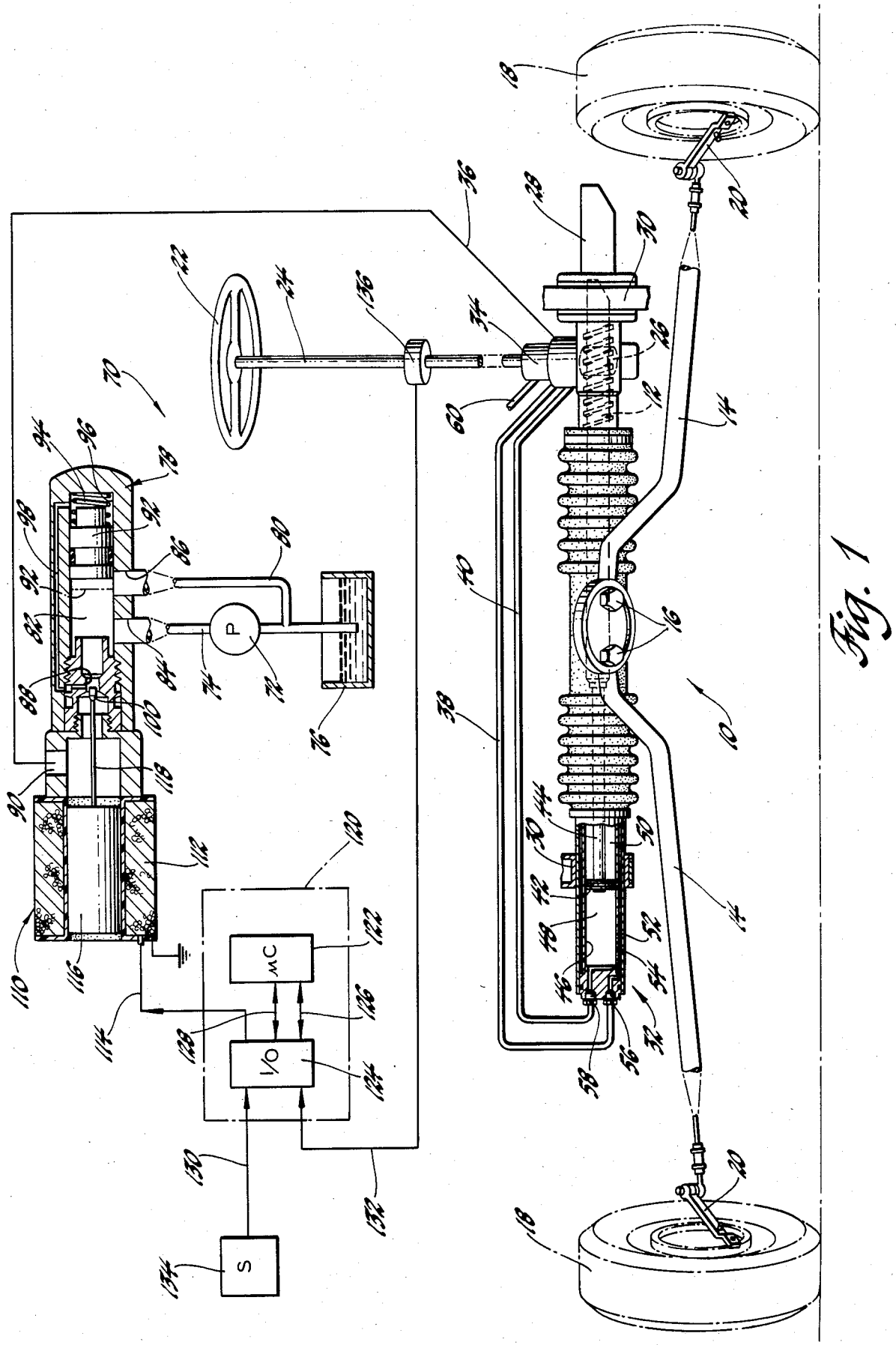
FIG. 1 is a schematic diagram depicting a power rack and pinion steering system, a source of hydraulic fluid, a hydraulic flow control device and an electronic control unit.
Figure 7:
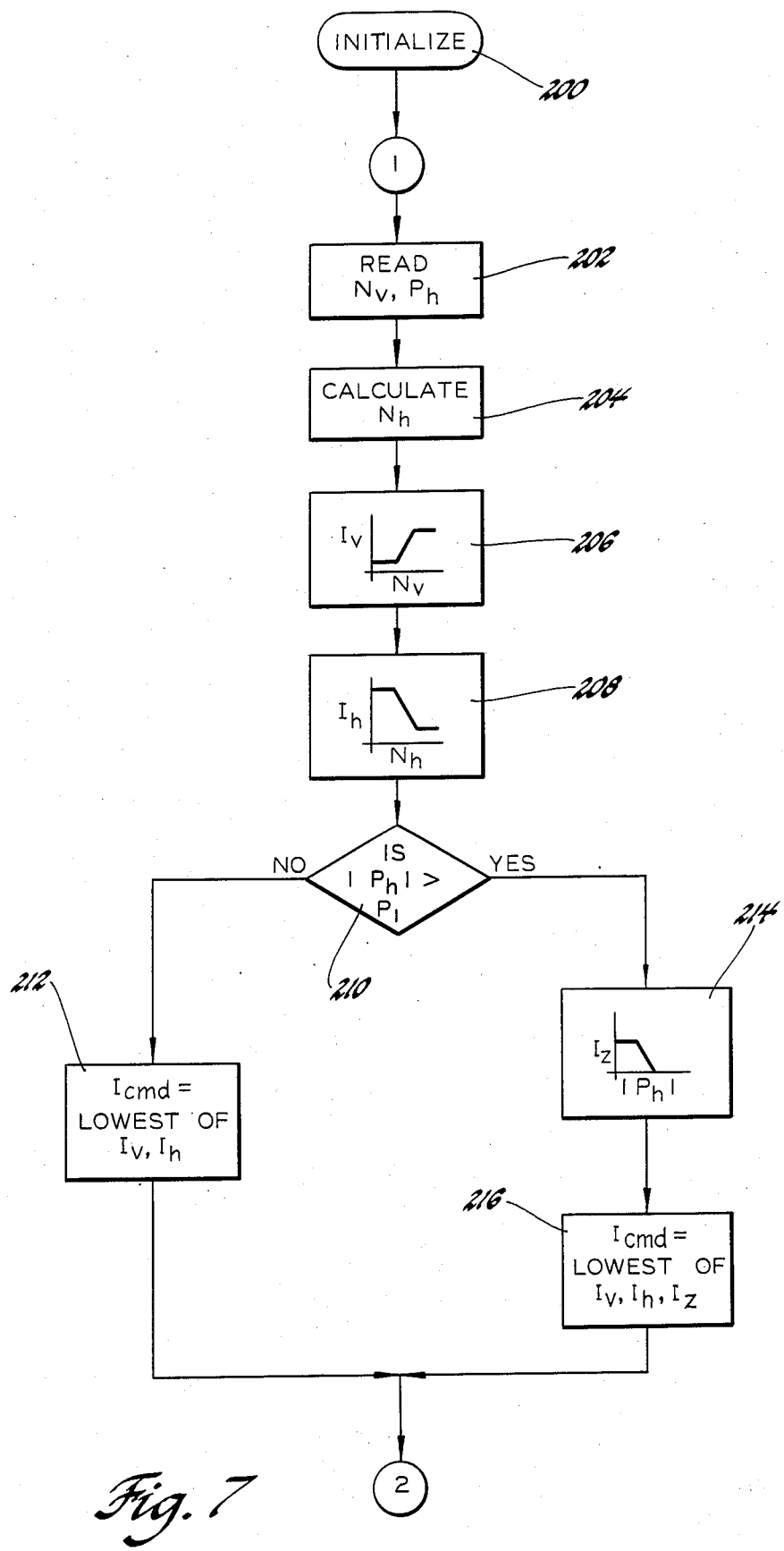
Figure 8:
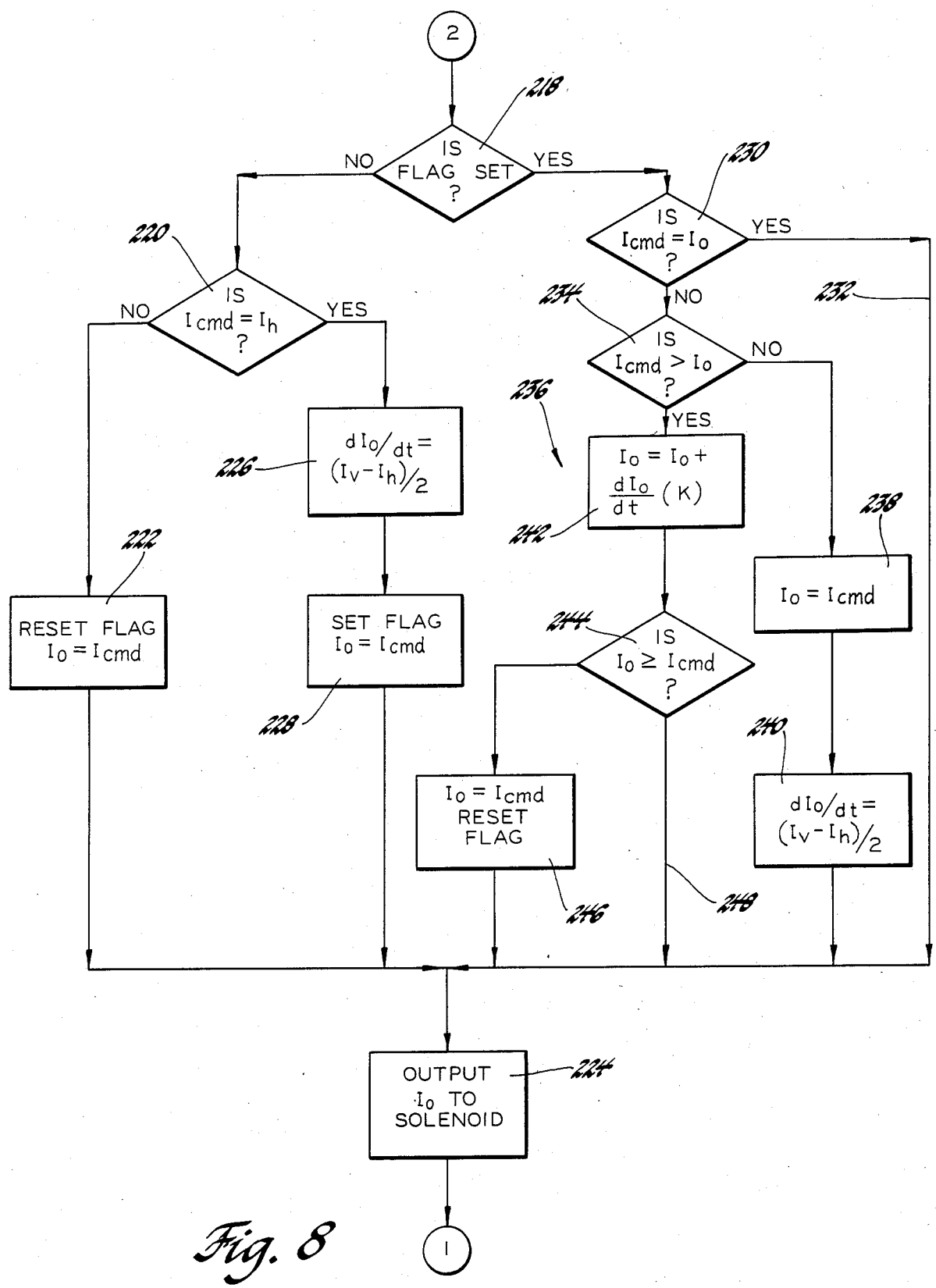

FIGS. 7 and 8 set forth a flow diagram to be executed by the control unit of FIG. 1 for implementing the flow control method of this invention.

Referring now more particularly to FIG. 1, reference numeral 10 generally designates a motor vehicle hydraulically assisted rack and pinion steering system.

Mechanically, the steering system 10 comprises a rack 12 and a pair of tie rods 14 connected to the rack 12 by bolts 16 and adapted to steer the vehicle wheels 18 through the steering arms 20. A handwheel 22 is connected through the shaft 24 to a pinion gear 26 which engages corresponding gear teeth on the rack 12 such that rotation of the handwheel 22 by the operator of the vehicle imparts linear motion to the rack 12 for steering the wheels 18. The rack 12 is mounted for sliding movement within a tubular housing 28 which is mounted to a support structure of the vehicle by brackets 30.

Hydraulically, the power steering system 10 comprises a power cylinder generally designated by the reference numeral 32 and a valving mechanism 34 for supplying pressurized hydraulic fluid from the line 36 to the power cylinder 32 via the lines 38 or 40. The power cylinder 32 comprises a piston 42 connected to the rack 12 via rod 44, an inner cylinder 46 in which the piston 42 is slidably disposed to form pressure chambers 48 and 50, and an outer concentric cylinder 52 which cooperates with the inner cylinder 46 to form a fluid passage 54 which communicates with the pressure chamber 50. The hydraulic line 38 communicates with the pressure chamber 50 through the fitting 56 and via a passage 54, and the the hydraulic line 40 communicates directly with the pressure chamber 48 through the fitting 58.

The valving mechanism 34 is a conventional device and operates to direct pressurized hydraulic fluid from line 36 to either line 38 or line 40 in accordance with the magnitude and direction of steering torque exerted on handwheel 22 by the operator of the vehicle. When the operator exerts clockwise steering torque on the handwheel 22 to effect rightward movement of the rack 12 as viewed in FIG. 1, fluid passages (not shown) in the valving mechanism 34 are established for supplying hydraulic fluid from line 36 to the pressure chamber 48 of power cylinder 32 via the line 40 and for exhausting hydraulic fluid from the pressure chamber 50 of power cylinder 32 via the passage 54 and the line 38. The resulting fluid pressure difference between the pressure chambers 48 and 50 creates a net force on the lefthand or outboard face of the piston 42, which force aids the operator exerted steering force. If the operator exerts steering torque on handwheel 22 in a counterclockwise direction to effect leftward movement of the rack 12 as viewed in FIG. 1, the fluid conducting passages in valving mechanism 34 operate to supply hydraulic fluid from line 36 to the pressure chamber 50 of power cylinder 32 via the passage 54 and the line 38 and to exhaust hydraulic fluid from the pressure chamber 48 via line 40. The resulting fluid pressure difference between the pressure chambers 48 and 50 creates a net force on the righthand or inboard face of piston 42, which force aids the operator exerted steering force. In either case, the size and hence fluid conducting capability of the passages within valving mechanism 34 are established in direct proportion to the magnitude of operator exerted steering torque so that the assist force is developed substantially in direct relation thereto. The hydraulic fluid exhaust line 60 is provided for returning excess hydraulic fluid to a fluid reservoir.

The mechanical and hydraulic elements of the steering system 10 described above, are set forth in further detail in the U.S. Pat. No. 4,428,450 to Stenstrom et al., issued Jan. 31, 1984, and assigned to the assignee of the present invention, such patent being incorporated herein by reference.

The reference numeral 70 generally designates a system for supplying a controlled flow of hydraulic fluid to line 36. The system 70 comprises a vane type positive displacement pump 72 for supplying high pressure hydraulic fluid to the line 74 from a fluid reservoir 76 and a solenoid operated flow control valve 78 for returning a controlled amount of the fluid to the reservoir 76 via the line 80 to regulate the flow supplied to line 36.

The flow control valve 78 includes a chamber 82 for receiving hydraulic fluid discharged from the pump 72 via line 74 and the input port 84. Hydraulic fluid supplied to the chamber 82 is either returned to the reservoir 76 via the outlet port 86 and the line 80, or is directed to the line 36 through the venturi 88 and the outlet port 90. The pump 72 provides a nearly constant flow of hydraulic fluid into the chamber 82, and the amount of flow directed to the line 36 depends on the axial position of the plunger 92 within the chamber 82. With the plunger 92 in the position shown in FIG. 1, a high percentage of the oil supplied by the pump 72 is returned to the reservoir 76 via outlet port 86 and the line 80. In such case, a relatively low flow is supplied to the valving mechanism 34 of steering system 10 via line 36. When the plunger 92 is moved leftward to the position indicated in phantom in FIG. 1, a relatively small percentage of the hydraulic fluid supplied to chamber 82 is returned to the reservoir 76 so that a relatively high flow is supplied to the valving mechanism 34 via line 36.

The position of the plunger 92 within the chamber 82 is determined by the spring 94 and the fluid pressures in chambers 82 and 96. The rightward force exerted on the plunger 92 by the fluid pressure in chamber 82 is countered by the leftward force exerted on the plunger 92 by the spring 94 and the fluid pressure in chamber 96. The chamber 96 is connected via passage 98 with the venturi 88, and the position of the pintle 100 within the venturi 88 determines the fluid pressure in chamber 96, and hence the position of the plunger 92 within the chamber 82. When the pintle 100 is in the position shown in FIG. 1, the fluid pressure in venturi 88 and hence chamber 96, is relatively low, and the plunger 92 is urged rightward to the position shown in FIG. 1 due to the force of the fluid pressure in chamber 82. When the pintle 100 is retracted out of the venturi 88, the fluid pressure in venturi 88 and hence chamber 96 increases and the plunger 92 is urged leftward to the phantom position shown in FIG. 1 due to the combined forces of the spring 94 and the fluid pressure in chamber 96.

Figure 2:
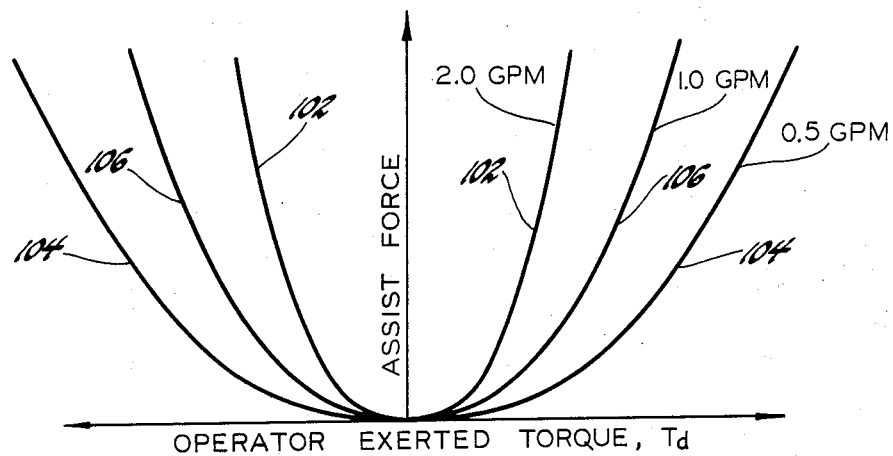
FIG. 2 is a graph showing the steering assist capability of the system depicted in FIG. 1 for three different operating conditions.

The pump 72 and venturi 88 are sized such that when the pintle 100 is fully retracted from the venturi 88, a relatively large amount of flow, sufficient to provide a high level of steering assist capability, is supplied to the valving mechanism 34 via line 36. In the illustrated embodiment, such relatively high flow is assumed to be approximately 2.0 gallons per minute (GPM), the resulting assist capability being depicted by the trace 102 in FIG. 2. The steering assist force is determined by the net pressure operating on the piston 42 in the power cylinder 32 of steering system 10, and is given in FIG. 2 as a function of the operator exerted steering torque $T_d$. When the pintle 100 is fully extended into the venturi 88, a relatively low amount of flow sufficient only to provide a relatively low level of steering assist capability is supplied to the valving mechanism 34 via line 36. In the illustrated embodiment, such low flow is assumed to be approximately 0.5 GPM, and the resulting assist capability is represented in FIG. 2 by the trace 104. The assist capability provided by an intermediate flow of 1.0 GPM is given in FIG. 2 by the trace 106.

The position of the pintle 100 within the venturi 88, and hence the fluid flow supplied to the valving mechanism 34, is controlled by the linear, or current proportional, solenoid 110. Essentially, the solenoid 110 comprises a coil 112 energizable with electric current via the conductor 114 and a ferromagnetic plunger 116 movably disposed therein. The pintle 100 is connected to the plunger 116 via rod 118 and the amount of current supplied to the coil 112 via line 114 determines the axial position of plunger 116 and pintle 100. In the illustrated embodiment, the solenoid 110 is designed so that pintle 100 is fully extended into venturi 88 in its normal or rest position, and is retracted out of the venturi 88 in direct proportion to the current supplied to the solenoid coil 112. Thus, a flow of approximately 2.0 GPM is supplied to the valving mechanism 34 when the coil current is at zero or its minimum value, and a flow of approximately 0.5 GPM is supplied to the valving mechanism 34 when the coil current is at its maximum value.

An electronic control unit designated generally by the reference numeral 120 controls the amount of current supplied to the solenoid coil 112 via line 114 in response to measured values of vehicle speed and handwheel position. Essentially, the control unit 120 comprises a microcomputer 122 and an input/output unit (I/O) 124 which communicates with the microcomputer 122 via an address-and-control bus 126 and a bi-directional data bus 128. The input/output unit 124 is adapted to receive a digital input representative of vehicle speed on line 130, and an analog input representative of handwheel position on line 132. The vehicle speed information on line 130 is obtained from a digital sensor 134 which may take the form of a toothed wheel fixed to a rotatable output shaft and a stationary variable reluctance or Hall effect device responsive to the passage of the teeth. The handwheel position information on line 132 is derived from an analog sensor 136 which may take the form of a potentiometer, the tap or wiper arm of such potentiometer being displaced by handwheel movement. The microcomputer 122 includes counter devices and an analog-to-digital converter (not shown) for converting the outputs of sensors 134 and 136 to suitable digital representations of vehicle and handwheel position for use in the control of the current supplied to solenoid coil 112 via line 114. A variety of electronic elements currently available on a commercial basis will suitably perform the control functions of the electronic control unit 120 and the identification of particular such devices herein is not deemed to be necessary.

Figure 3:
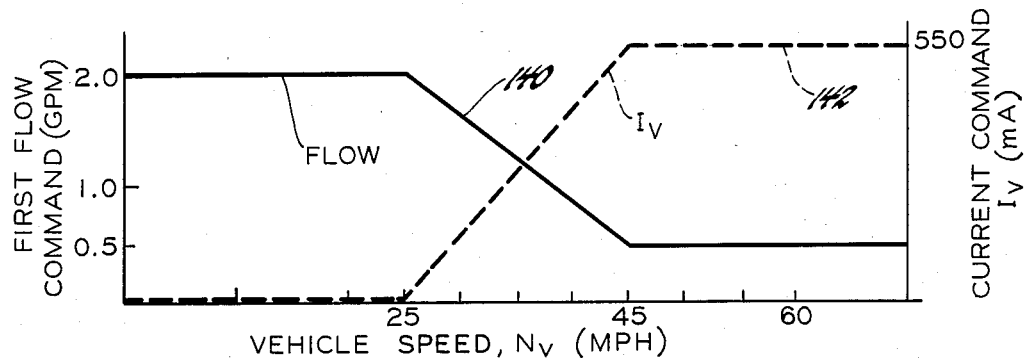
FIG. 3 is a graph depicting the first flow command and a corresponding current command $I_v$ as a function of vehicle speed.
Figure 4:
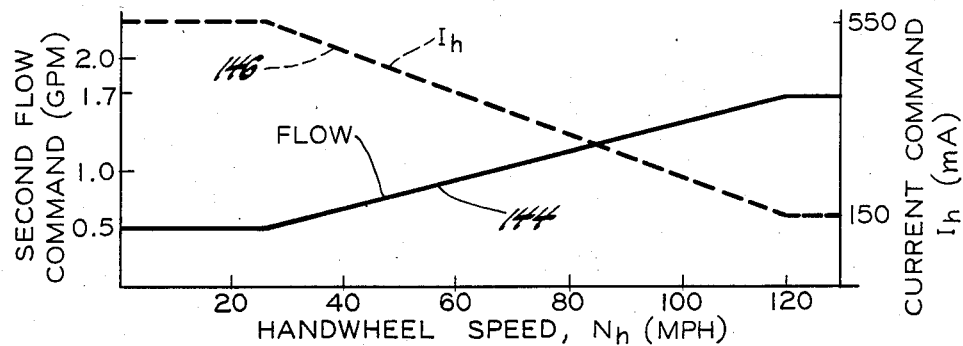
FIG. 4 depicts the second flow command and a corresponding current command $I_h$ as a function of handwheel speed of rotation.

The flow control valve 78 is controlled according to this invention in accordance with one of a plurality of flow/current commands. The first flow/current command is determined in accordance with vehicle speed $N_v$ in miles per hour (MPH) and is depicted in FIG. 3. A second flow/current command is determined as a function of handwheel speed of rotation $N_h$ in revolutions per minute (rpm) and is depicted in FIG. 4. A third flow/current command is determined as a function of the handwheel angle of rotation and is depicted in FIG. 6.

Referring now more particularly to FIG. 3, the trace 140 depicts a vehicle speed determined flow command for the flow control valve 78 and the trace 142 depicts the corresponding current command $I_v$. As seen in the figure and as indicated above in reference to FIG. 1, the relationship between the solenoid coil current and the hydraulic flow supplied to the valving mechanism 34 is inverse. When the vehicle speed is relatively low—less than 25 MPH in the illustrated embodiment—a relatively high level of steering assist capability is likely to be required and the solenoid coil 112 is de-energized to maintain the hydraulic flow at approximately 2.0 GPM. The steering assist capability is thereby maintained at a relatively high level as graphically illustrated in FIG. 2 by the trace 102, where it can be seen that a relatively small amount of operator exerted torque $T_d$ results in a relatively high level of steering assist. At high vehicle speeds—greater than 45 MPH in the illustrated embodiment—a relatively low level of steering assist capability is likely to be required and the solenoid coil 112 is energized at the maximum current level of 550 mA to maintain the hydraulic flow at the reduced level of 0.5 GPM to effect an energy savings in the pump 72 and to improve the on-center stability of the vehicle. The steering assist capability is thereby maintained at a relatively low level as graphically illustrated in FIG. 2 by the trace 104, where it can be seen that a relatively small amount of operator exerted steering torque $T_d$ results in a relatively low level of steering assist. Between the vehicle speeds of 25 MPH and 45 MPH the flow command is linearly decreased from 2.0 GPM to 0.5 GPM; between such speeds, the current command $I_v$ is linearly increased from zero to 550 mA.

As described above in reference to FIG. 1, the handwheel 22 is mechanically connected to the piston 42 of the steering system power cylinder 32. When the handwheel is rotated rapidly by the operator of the vehicle, the piston 42 also moves rapidly due to the mechanical connection. To maintain a given level of steering assist in relation to the operator exerted torque, the hydraulic flow supplied to the valving mechanism 34 must be sufficient to maintain the proper pressure differential across the piston 42 despite its movement. Thus, a rapid movement of the handwheel 22 is usually accompanied by a reduction in the level of assist from the level that would otherwise be provided for a given amount of operator exerted torque $T_d$. At higher vehicle speeds, the reduced flow which is normally desired (as shown by trace 140) may be insufficient to provide any assist force. While some reduction in the level of assist during rapid steering maneuvers is acceptable, and perhaps desirable, the level of assist should not be permitted to fall below a predetermined minimum level such as that nominally provided with a flow of 0.5 GPM as shown by the trace 104. To maintain the steering assist at a level at least as great as the predetermined minimum level, the flow to the valving mechanism 34 may thus have to be increased above the vehicle speed determined value depicted in FIG. 3, at least for vehicle speeds in excess of 25 MPH. The second flow command, discussed below in reference to FIG. 4, is determined as a function of the handwheel speed of rotation and indicates the flow required to maintain a level of assist of the magnitude that is nominally generated with a flow of 0.5 GPM as depicted by the trace 104 in FIG. 2. To ensure that there is enough flow to the valving mechanism 34 in any steering maneuver to maintain at least the predetermined minimum level of assist depicted by the trace 104, the flow control valve 78 is operated in accordance with the larger of the first and second flow commands. In terms of the current commands, $I_v$ and $I_h$, the flow control valve 78 is controlled in accordance with the lower of $I_v$ and $I_h$.

Referring now more particularly to FIG. 4, the trace 144 depicts a handwheel speed determined flow command for the flow control valve 78 and the trace 146 depicts the corresponding current command $I_h$. When the handwheel speed is relatively low—less than 25 rpm in the illustrated embodiment—even the lowest vehicle speed determined flow (0.5 GPM) is sufficient to provide a level of steering assist at least as great as that represented by the trace 104 in FIG. 2. For such speeds, the solenoid coil current command $I_v$ is maintained at the maximum value of 550 mA, which corresponds to the minimum vehicle speed determined flow of 0.5 GPM. Under such conditions, the current command $I_v$ is always less than or equal to the current command $I_h$, and the flow control valve 78 is controlled so as to provide the vehicle speed determined flow value. At the other end of the handwheel speed scale, 120 rpm was found in vehicle testing to be the fastest handwheel speed that could realistically occur in a vehicle. As such, the second flow command does not call for increased flow for handwheel speeds in excess of 120 rpm. Likewise, a limitation for the second flow command would be reached if, for a particular system, a handwheel speed of less than 120 rpm would require a flow of greater than the maximum flow of 2.0 GPM.

The slope of the second flow command (trace 144) for handwheel speeds between 25 rpm and 120 rpm is determined as a function of the diameter of the piston 42 and the relation between the speed of rotation of handwheel 22 and the resulting linear speed of the rack 12. The second flow command in such region represents the flow, for a given handwheel movement, required to backfill the respective pressure chamber 48 or 50 of power cylinder 32 and to maintain a pressure differential across piston 42 which will generate the predetermined minimum level of steering assist. In effect, the second flow command represents the minimum flow to be supplied to the valving mechanism 34 in order to prevent the level of steering assist from falling below that depicted by the trace 104 in FIG. 2. Such information may be determined theoretically or empirically.

FIGS. 5A-C illustrate the operation of the flow control method of this invention and in particular, relates to the manner in which the hydraulic flow is returned to a vehicle speed determined value at the termination of an evasive maneuver. For the purpose of discussion, an evasive maneuver is defined as any steering movement for which the second flow command is greater than the first flow command. In the illustration depicted by FIGS. 5A-C, it is assumed that the vehicle speed remains substantially constant at approximately 40 MPH. As such, the current command $I_v$ remains substantially constant at approximately 400 mA, as may be determined from the trace 142 in FIG. 3, and as seen in FIG. 5B. As seen in FIG. 5A, the handwheel speed $N_h$ experiences step changes at times $T_0$ and $T_1$. At time $T_0$, $N_h$ increases from zero to 120 rpm; at time $T_1$, $N_h$ decreases from 120 rpm to zero. As seen in FIG. 5B, the current command $I_h$ experiences a corresponding step response, falling from 550 mA to 150 mA at time $T_0$ and rising back to 550 mA at time $T_1$. FIG. 5C depicts the output current $I_o$ supplied to the solenoid coil 112 via line 114. Thus, at time $T_0$, the output current $I_o$ falls from its vehicle speed determined value ($I_v$) of 400 mA to the handwheel speed determined value ($I_h$) of 150 mA. The resulting increase in hydraulic flow supplied to the valving mechanism 34 of steering system 10 permits the level of steering assist to be maintained at least as great as the predetermined minimum level depicted by the trace 104 in FIG. 2.

At the termination of the handwheel movement at time $T_1$, the current $I_o$ supplied to the solenoid coil 112 is not immediately returned to the vehicle speed determined value ($I_v$) of 400 mA. Rather, it is returned to such value at a controlled rate as indicated by the reference numeral 150 over a period of time $T_r$. Thus, increases in the hydraulic flow supplied to valving mechanism 34 in response to an increased flow command are carried out immediately while decreases in the flow due to a reduced flow requirement are carried out at a controlled rate. In this way, the steering system 10 responds quickly to provide steering assist at the commencement of an evasive maneuver but returns to the reduced flow condition at a rate consistent with good drivability. Ideally, the return from a handwheel speed determined flow to a vehicle speed determined flow should be transparent to the operator of the vehicle; in the illustrated embodiment, this objective is achieved with a return period $T_r$ of approximately two (2) seconds.

FIG. 6 graphically depicts a third flow command to be compared with the first and second flow commands depicted in FIGS. 3 and 4. The third flow command is designated by the reference numeral 160 while the corresponding current command for the solenoid coil 112 of flow control valve 78 is designated by the reference numeral 162. The third flow command is provided to ensure that in situations where the vehicle is being steered along a circular path, such as an extended bend in the roadway or a freeway ramp, a suitable level of steering assist is provided regardless of the vehicle speed. Such operation is sensed according to this invention, with the handwheel position sensor 136, and the third flow command is determined as a function of the handwheel angle of rotation from a dead center position, designated in FIG. 6 as zero. As seen by the trace 160 in FIG. 6, the third flow command is maintained at the minimum flow value of 0.5 GPM ($I_z = 550$ mA) when the absolute value of handwheel rotation is $P_1$ degrees or less. When the absolute value of the handwheel rotation ($|P_h|$) exceeds $P_1$, it is assumed that a driving condition of the type referred to above is being encountered and the flow command is increased from the minimum value of 0.5 GPM in direct proportion to the amount of rotation by which the rotation angle $P_1$ is exceeded. Under such conditions, the current command $I_z$ decreases from its maximum value of 550 mA in proportion to the amount by which the angle of rotation exceeds the reference $P_1$. For handwheel rotations of $P_2$ degrees and greater, the current command $I_z$ is maintained at zero to provide the maximum flow of 2.0 GPM. As indicated above, the current command $I_z$ is compared with the current commands $I_v$ and $I_h$, and the flow control valve 78 is controlled in accordance with the lowest of the three commands. As a result, a suitable level of steering assist is provided in the course of a prolonged steering maneuver even though the vehicle speed determined and/or handwheel speed determined flow command may indicate that a lower flow value is suitable.

FIGS. 7 and 8 depict a flow diagram representative of suitable program instructions to be executed by the microcomputer 122 for carrying out the control functions of this invention. The flow chart begins on FIG. 7 and continues into FIG. 8 as indicated by the circled numeral 2. The circled numeral 1 at the bottom of the flow chart in FIG. 8 corresponds to the circled numeral 1 in FIG. 7 and indicates that the portions of the flow chart following the circled numeral 1 in FIG. 7 are re-executed following the execution of the instructions shown in FIG. 8.

When power is first applied to the system at the initiation of vehicle operation, the instruction block 200 is executed to initialize the values of the program variables and flags. Such initialization is necessary, as will be understood by those skilled in the art, to ensure repeatability at the initiation of each period of vehicle operation. Following the initialization process, instruction block 202 is executed to read the input variables of vehicle speed $N_v$ and handwheel position $P_h$. The handwheel speed $N_h$ is then calculated as indicated by instruction block 204. As will be well-known by those skilled in the art, the calculation of handwheel speed from handwheel position information may be carried out by computing the difference between the current handwheel position and a previously measured handwheel position; the time between such measurements being substantially constant.

As indicated at instruction block 206, a first current command $I_v$ is determined as a function of vehicle speed $N_v$ as explained above in reference to FIG. 3. Similarly, a second current command $I_h$ is determined as a function of handwheel speed $N_h$ as explained above in reference to FIG. 4 and as indicated at instruction block 208. Then, the absolute value of the handwheel position $|P_h|$ is compared with the reference handwheel position $P_1$ as indicated at decision block 210. As described above in reference to FIG. 6, this comparison is used to determine if the vehicle is being steered along a curved path such as an extended bend in the roadway or a freeway ramp. In such case, it is desirable from the standpoint of drivability to maintain more than the minimum level of steering assist. If the absolute value of handwheel position $|P_h|$ is less than $P_1$ degrees, the current command $I_{cmd}$ is determined in accordance with the lowest of the vehicle speed and handwheel speed related current commands, $I_v$ and $I_h$ as indicated at instruction block 212. If the absolute value of handwheel position $|P_h|$ is greater than $P_1$ degrees on the other hand, a third current command $I_z$ is determined as a function of the absolute value of handwheel position $|P_h|$ as indicated at instruction block 214 and as described above in reference to FIG. 6. In such case, the current command $I_{cmd}$ is determined according to the lowest of the vehicle speed, handwheel speed and handwheel position related commands $I_v$, $I_h$ and $I_z$, respectively, as indicated at instruction block 216.

Once a current command $I_{cmd}$ is determined either by instruction block 212 or instruction block 216 in FIG. 7, the program execution is continued at decision block 218 as indicated by the circled numerals 2. Decision block 218 determines if a particular memory location or flag within the microcomputer 122 is set. In the flow chart portion shown in FIG. 8, such flag is used to indicate the status of an evasive maneuver. At the initiation of vehicle operation, the flag is reset by the instruction block 200. Thus, initially, the decision block 218 will be answered in the negative. In such case, it is determined at decision block 220 if the current command $I_{cmd}$ is equal to the current command $I_h$. If not, the current command $I_{cmd}$ is not being chosen in response to handwheel speed $N_h$ and an evasive steering maneuver is not in progress. In such case, instruction block 222 is executed to reset the flag and to set the output current $I_o$ equal to the command current $I_{cmd}$. The output current $I_o$ is then applied to the solenoid coil 112 of the flow control valve 78 as indicated by the instruction block 224. If, at decision block 220, it is determined that the current command $I_{cmd}$ is equal to the current command $I_h$, then the current command $I_{cmd}$ is, in fact, being controlled by the handwheel speed related value and the presence of an evasive maneuver is indicated. In such case, the instruction block 226 is executed to determine the proper rate or $dI_o/dt$ value to result in a return period $T_r$ of 2 seconds, and instruction block 228 is executed to set the flag to indicate that an evasive maneuver has been initiated, and to set the output current value $I_o$ equal to the current command $I_{cmd}$. Such output current value $I_o$ is then applied to the solenoid coil of the flow control valve 78 as indicated by instruction block 224.

Once the flag has been set to indicate that an evasive maneuver has been initiated, the decision block 218 is answered in the affirmative. In such case, the relative values of the current command $I_{cmd}$ and the output current $I_o$ indicate the status of the evasive maneuver. If the current command $I_{cmd}$ is equal to the output current $I_o$ as sensed at decision block 230, the evasive maneuver is in progress and the output current value $I_o$ is unchanged as indicated by the flow diagram line 232. If the current command $I_{cmd}$ is greater than the output current $I_o$ as determined at decision block 234, the evasive maneuver is over or at least lessened and the instruction blocks designated by the reference numeral 236 are executed to ramp the output current $I_o$ into conformity with the current command $I_{cmd}$ at the rate determined at decision block 226. If, at decision block 234, it is determined that the current command $I_{cmd}$ is less than the output current $I_o$, an increase in the severity of the evasive maneuver is indicated and instruction blocks 238 and 240 are executed to immediately bring the output current $I_o$ into conformance with the current command $I_{cmd}$, and to determine a new rate or $dI_o/dt$ value.

The instruction blocks designated generally by the reference numeral 236 include a first instruction block 242 for increasing the output current value $I_o$ at the rate determined at decision blocks 226 or 240 according to the expression:

$$I_o = I_o + dI_o/dt \, (K)$$

where K is a gain constant. The decision block 244 then determines if the new value of output current $I_o$ is greater than or equal to the current command $I_{cmd}$. If so, the output current $I_o$ has been ramped into conformity with the command current $I_{cmd}$ and the instruction block 246 is executed to set the output current value $I_o$ equal to the command current $I_{cmd}$ and to reset the flag. If it is determined at decision block 244 that the output current $I_o$ is less than the command value $I_{cmd}$, the output current ramp is not yet completed, and the execution of instruction block 246 is skipped as indicated by the flow diagram line 248. In either case, instruction block 224 is then executed to output the current value $I_o$ to the solenoid coil 112.

In view of the above, it will thus be understood that the program instructions represented by the flow diagram blocks in FIG. 7 operate to arrive at a current command value $I_{cmd}$ which is suitable for the present driving condition, taking into account the vehicle speed, handwheel position and handwheel speed. The program instructions represented by the flow diagram blocks in FIG. 8 are responsive to the current command $I_{cmd}$ and apply an output current value $I_o$ to the solenoid coil 112 of the flow control valve 78 in a manner to effect decreases in the steering assist capability at a controlled rate. Increases in the steering assist capability are made without delay. Prior to the initiation of an evasive maneuver, the output current value $I_o$ is maintained equal to the current command $I_{cmd}$. At the onset of an evasive maneuver as determined by decision block 220, the flag is set to indicate that an evasive maneuver is in progress and a rate value $dI_o/dt$ is determined at instruction block 228. Thereafter, the flow diagram portions designated by the reference numerals 230-248 compare the current command $I_{cmd}$ to the output current $I_o$ and adjust the value of the output current $I_o$ accordingly. In the course of the evasive maneuver, the output current $I_o$ is maintained at the current command value $I_{cmd}$. If the severity of the evasive maneuver is increased, as sensed by the decision block 234, the output current is decreased without delay to the new lower current command value $I_{cmd}$. When the evasive maneuver is over or at least lessened, again as determined at instruction block 236, the output current value $I_o$ is increased at the calculated rate until it is brought into correspondence with the command value $I_{cmd}$, at which point, the flag is reset to indicate the termination of the evasive maneuver. Thereafter, the decision block 218 is answered in the negative and the flow diagram portion designated by the reference numerals 220-228 is executed as described above to maintain the output current $I_o$ in conformance with the current command $I_{cmd}$.

While this invention has been described in reference to the illustrated embodiment, it will be understood that various modifications thereto will occur to those skilled in the art and that systems incorporating such modifications may fall within the scope of this invention, which is defined by the appended claims. By way of example, and without limitation, this invention could also be applied to a demand-type steering system where the hydraulic flow is normally maintained at relatively low level regardless of vehicle speed and increased only in response to a sensed steering demand. In such an application, the flow in the presence of steering demand would be determined in accordance with the teachings of this invention. The use of this invention in a steering system having an electric motor driven pump is also contemplated.

The embodiments of the invention in which an exclusive property or privilege is claimed are defined as follows:

1. In a vehicle steering system including a steerable wheel, a handwheel for transmittting operator exerted steering force to the steerable wheel through a linkage mechanism, hydraulic cylinder means having a variable capacity cavity adapted to be pressurized with hydraulic fluid and an output member for exerting a power assist steering force on said steerable wheel through said linkage mechanism in relation to the fluid pressure in said cavity, a regulatatable flow source of hydraulic fluid, and valving means for directing hydraulic fluid from the source to the hydraulic cylinder cavity in relation to the magnitude and direction of operator exerted steering force such that the power assist steering force exerted by the hydraulic cylinder output member aids the operator exerted steering force, a method of regulating the flow of the source of hydraulic fluid, comprising the steps of:

developing a first flow command for said source in relation to the vehicle speed, such command being relatively high to provide a high level of power assist capability at low vehicle speeds and relatively low to provide a lower level of power assist capability at high vehicle speeds, thereby to effect energy savings and improved drivability at higher vehicle speeds;

developing a second flow command for said source as a function of the flow required to provide said lower level of power assist capability when the capacity of the hydraulic cylinder cavity is increased due to movement of the hydraulic cylinder output member in response to operator exerted steering force;

regulating the flow of the source of hydraulic fluid in accordance with the higher of the first and second flow commands such that the flow is increased from a relatively low vehicle speed related value substantially without delay to quickly provide power assist capability at a level at least as great as said lower level when the second flow command increases at the onset of an evasive steering maneuver, but is decreased to said vehicle speed related value at a progressive rate when the second flow command decreases at the completion of the evasive maneuver.

2. A method as set forth in claim 1, wherein:
the progressive rate of flow decrease is determined such that the flow of the source of hydraulic fluid is brought into correspondence with the higher of the first and second flow commands a predetermined period of time following the completion of the evasive steering maneuver.

3. In a vehicle steering system including a steerable wheel, a handwheel for transmitting operator exerted steering force to the steerable wheel through a linkage mechanism, hydraulic cylinder means having a variable capacity cavity adapted to be pressurized with hydraulic fluid and an output member for exerting a power assist steering force on said steerable wheel through said linkage mechanism in relation to the fluid pressure in said cavity, a regulatable flow source of hydraulic fluid, and valving means for directing hydraulic fluid from the source to the hydraulic cylinder cavity in relation to the magnitude and direction of operator exerted steering force such that the power assist steering force exerted by the hydraulic cylinder output member aids the operator exerted steering force, apparatus for regulating the flow of the source of hydraulic fluid, comprising:

means including a control unit for developing a first flow command for said source in relation to the vehicle speed, such command being relatively high to provide a high level of power assist capability at low vehicle speeds and relatively low to provide a lower level of power assist capability at high vehicle speeds, thereby to effect energy savings and improved drivability at higher vehicle speeds, for developing a second flow command for said source as a function of the flow required to provide said lower level of power assist capability when the capacity of the hydraulic cylinder cavity is increased due to movement of the hydraulic cylinder output member is response to operator exerted steering force, for generating a desired flow command in accordance with the higher of the first and second flow commands, and for regulating the flow of the source of hydraulic fluid in accordance with the desired flow command so as to provide power assist capability at a level at least as great as said lower level during an evasive maneuver of the vehicle, the increases in the flow when the desired flow command increases due to an increase in the second flow command at the onset of an evasive steering maneuver being carried out substantially without delay, and the decreases in the flow when the desired flow command decreases due to a decrease in the second flow command at the completion of the evasive steering maneuver being carried out at a progressive rate.

4. Apparatus as set forth in claim 3, wherein:
the progressive rate of flow decrease is determined such that the flow of the source of hydraulic fluid is brought into correspondence with the desired flow command a predetermined period of time following the completion of the evasive steering maneuver.

5. In a vehicle steering system including a steerable wheel, a handwheel for transmitting operator exerted steering force to the steerable wheel through a linkage mechanism, hydraulic cylinder means having a variable capacity cavity adapted to be pressurized with hydraulic fluid and an output member for exerting a power assist steering force on said steerable wheel through said linkage mechanism in relation to the fluid pressure in said cavity, a regulatable flow source of hydraulic fluid, and valving means for directing hydraulic fluid from the source to the hydraulic cylinder cavity in relation to the magnitude and direction of operator exerted steering force such that the power assist steering force exerted by the hydraulic cylinder output member aids the operator exerted steering force, a method of regulating the flow of the source of hydraulic fluid, comprising the steps of:
developing a first flow command for said source in relation to the vehicle speed, such command being relatively high to provide a high level of power assist capability at low vehicle speeds and relatively low to provide a lower level of power assist capability at high vehicle speeds, thereby to effect energy savings and improved drivability at higher vehicle speeds;
developing a second flow command for said source as a function of the flow required to provide said lower level of power assist capability when the capacity of the hydraulic cylinder cavity is increased due to movement of the hydraulic cylinder output member in response to operator exerted steering force;
generating an output flow command in accordance with the higher of the first and second commmands for regulating the flow of the source of hydraulic fluid, the output flow command being increased from a relatively low vehicle speed related value substantially without delay to quickly provide power assist capability at a level at least as great as said lower level when the second flow command increases at the onset of an evasive steering maneuver, and decreased to said vehicle speed related value at a progressive rate when the second flow command decreases at the completion of the evasive maneuver.

6. A method as set forth in claim 5, wherein:
the progressive rate of output flow command decrease is determined such that the output flow command is brought into correspondence with the higher of the first and second flow commands a predetermined period of time following the completion of the evasive steering maneuver.

7. In a vehicle steering system including a steerable wheel, a handwheel for transmitting operator exerted steering force to the steerable wheel through a linkage mechanism, hydraulic cylinder means having a variable capacity cavity adapted to be pressurized with hydraulic fluid and an output member for exerting a power assist steering force on said steerable wheel through said linkage mechanism in relation to the fluid pressure in said cavity, a regulatable flow source of hydraulic fluid, and valving means for directing hydraulic fluid from the source to the hydraulic cylinder cavity in relation to the magnitude and direction of operator exerted steering force such that the power assist steering force exerted by the hydraulic cylinder output member aids the operator exerted steering force, apparatus for regulating the flow of the source of hydraulic fluid, comprising:
means including a control unit for developing a first flow command for said source in relation to the vehicle speed, such command being relatively high to provide a high level of power assist capability at low vehicle speeds and relatively low to provide a lower level of power assist capability at high vehicle speeds, thereby to effect energy savings and improved drivability at higher vehicle speeds, for developing a second flow command for said source as a function of the flow required to provide asid lower level of power assist capability when the capacity of the hydraulic cylinder cavity is increased due to movement of the hydraulic cylinder output member in response to operator exerted steering force, for generating an output flow command in accordance with the higher of the first and second flow commands such that increases in the output flow command due to an increase in the second flow command at the onset of an evasive steering maneuver are carried out substantially without delay, and decreases in the output flow command due to a decrease in the second flow command at the completion of the evasive steering maneuver are carried out at a progressive rate, and for regulating the flow of the source of hydraulic fluid in accordance with the output flow command so as to provide power assist capability at a level at least as great as said lower level during an evasive maneuver of the vehicle.

8. Apparatus as set forth in claim 7, wherein:
the progressive rate of output flow command decrease is determined such that the output flow command is brought into correspondence with the first flow command a predetermined period of time following the completion of the evasive steering maneuver.

* * * * *

UNITED STATES PATENT AND TRADEMARK OFFICE
Certificate

Patent No. 4,629,025

Patented: Dec. 16, 1986

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is:

Brian D. Brasier, Saginaw, Mich.; Kenneth J. Hill, Saginaw, Mich.; John F. Yonker, Frankemuth, Mich.; Lawrence W. Tomczak, Rochester Hills, Mich.; Thomas J. Waraksa, Clarkston, Mich.; Mark A. Freeborough, Royal Oak, Mich.

Signed and Sealed this 17th Day of October, 1989

CHARLES A. MARMOR

*Supervisory Patent Examiner*
*Art Unit 316*